(12) United States Patent
Shim

(10) Patent No.: US 9,812,034 B2
(45) Date of Patent: Nov. 7, 2017

(54) EDUCATIONAL KIT FOR PRACTICING ELECTRONIC CIRCUIT DESIGN

(71) Applicant: Henry Hyunbo Shim, Los Angeles, CA (US)

(72) Inventor: Henry Hyunbo Shim, Los Angeles, CA (US)

( * ) Notice: Subject to any disclaimer, the term of this patent is extended or adjusted under 35 U.S.C. 154(b) by 195 days.

(21) Appl. No.: 14/738,833

(22) Filed: Jun. 13, 2015

(65) Prior Publication Data
US 2016/0365001 A1    Dec. 15, 2016

(51) Int. Cl.
G09B 19/00    (2006.01)
G09B 23/18    (2006.01)

(52) U.S. Cl.
CPC .................................. *G09B 23/185* (2013.01)

(58) Field of Classification Search
None
See application file for complete search history.

(56) References Cited

U.S. PATENT DOCUMENTS

| | | | |
|---|---|---|---|
| 3,038,139 A | 6/1962 | Bonanno | |
| 3,175,304 A * | 3/1965 | Och | G09B 23/185 |
| | | | 434/224 |
| 3,324,572 A | 6/1967 | Robarge | |
| 3,510,963 A | 5/1970 | Zbar et al. | |
| 3,546,793 A * | 12/1970 | Roelofs | G09B 23/186 |
| | | | 434/118 |
| 3,694,931 A * | 10/1972 | Bialek | G09B 23/186 |
| | | | 434/118 |
| 3,845,573 A | 11/1974 | Kasamatsu | |
| 3,864,849 A * | 2/1975 | Valentine | G09B 25/02 |
| | | | 434/314 |
| 4,112,593 A * | 9/1978 | Hill | G09B 23/185 |
| | | | 361/809 |
| 4,752,756 A | 6/1988 | Bartel | |
| 5,742,486 A * | 4/1998 | Yangkuai | A63H 33/042 |
| | | | 361/807 |
| 6,449,167 B1 | 9/2002 | Seymour | |
| 6,910,894 B2 * | 6/2005 | Basconi | G09B 1/02 |
| | | | 174/260 |
| 7,144,255 B2 * | 12/2006 | Seymour | H01R 13/627 |
| | | | 434/118 |
| 7,611,357 B2 * | 11/2009 | Han | H01R 11/30 |
| | | | 434/224 |

(Continued)

*Primary Examiner* — Sunit Pandya

(57) ABSTRACT

An educational kit for teaching kids/beginners about designing electronic circuit is provided. The educational kit according to the current application comprises of; 1) a square hard board comprised of a stiff non- conductive material, 2) a steel plate encasing back side of the square board, 3) pluralities of various kinds of electronic components which have wire type leads/terminals for connection, 4) pluralities of small permanent magnets of circular shape, and 5) a separate manual wherein various electronic circuits are printed thereon. Pluralities of dents of circular shape and square shape are developed on the front side of the board to receive magnets and electronic components, respectively. Another embodiment of the hard board has pluralities of circular or square dents spaced with same intervals. The educational kit of the current application renders easy set up and change of the configuration of electronic circuits even for beginners and kids.

9 Claims, 6 Drawing Sheets

(56) References Cited

U.S. PATENT DOCUMENTS

| | | | |
|---|---|---|---|
| 7,758,349 B2 * | 7/2010 | Han | H01R 11/30 434/224 |
| 2003/0043554 A1 | 3/2003 | Seymour | |
| 2004/0229489 A1 | 11/2004 | Lu | |
| 2005/0036264 A1 | 2/2005 | Aguilar | |

* cited by examiner

EDUCATIONAL KIT FOR PRACTICING ELECTRONIC CIRCUIT DESIGN

FIELD OF THE INVENTION

Current application related to an educational kit for practicing electronic circuit design for beginners, especially related to a circuit design practicing kit without soldering but use magnetic force.

BACKGROUND OF THE INVENTION

In many instances, a circuit is hand soldered by a person assembling an electronic circuit. This is particularly true where electronic kits are provided for educational purposes or where a new circuit is being designed and tested. For example, a kit for a particular type of circuit, such as a radio, may be given to or otherwise obtained by a child to assemble for educational purposes. The kit will usually include a printed circuit board and the necessary electronic components to be connected by soldering to the printed circuit board to make the desired circuit. The soldering of the components is usually not an essential learning step to be performed by the child and, soldering can be difficult and dangerous for a child. First, the person doing the soldering has to have a soldering iron. An inexperienced person can easily burn himself or herself with the soldering iron. Also, excessive heat can damage and destroy electronic components. Thus, if too much heat is applied to a component during soldering, the component can be destroyed. Further, if substitution of components is a part of the learning exercise in assembling and working with the circuit, or is part of designing and testing a new circuit, soldering the components to the printed circuit board is counterproductive in that a particular component may have to be unsoldered to disconnect it from the circuit to replace it with a substitute component. Meanwhile, various bread boarding devices are available for use in designing electronic circuits where the leads of electronic components can be inserted into connectors on a breadboard device, such bread boarding devices generally require special knowledge of the devices and how they work and are not generally used in merely assembling a particular desired circuit in an educational kit. It is the purpose of the current application to provide an educational kit to set up a desired electronic circuit without soldering and change the configuration of the electronic circuit by just rearrange of the electronic components on a board.

DESCRIPTION OF PRIOR ARTS

U.S. Pat. No. 3,038,139 to Bonanno illustrates an electrical contact socket and a socket for apparatus having magnetizable terminals requiring electrical actuation, in which the apparatus is held in the socket by magnetism and without any mechanical clamping means.

U.S. Pat. No. 3,175,304 to OCH, et al. illustrates an educational visual device for teaching electrical circuit theory, fundamentals, electronics, and the like.

U.S. Pat. No. 3,324,572 to ROBARGE illustrates an electrical instruction kit and connector for use therein.

U.S. Pat. No. 3,510,963 to ZBAR, et al. illustrates an apparatus for demonstrating the operation of electrical and electronic circuits and systems comprised of a chalk board of ferromagnetic material with power distribution bars disposed about the periphery of the chalk board and provided with pluralities of connection points consisting of drilling holes.

U.S. Pat. No. 3,845,573 to Kasamatsu illustrates an electrical circuit assembling apparatus for experimentation, allowing various electronic parts to be located on an insulating base plate, on which terminals are interconnected by means of leads, by making use of magnetic attraction, for which either a metal plate is used underneath the base plate, or block-shaped metal pieces, which latter can be above or below said base plate. For assemble the circuit, each end of the leads from electronic compartment should be soldered or screwed for connection.

U.S. Pat. No. 4,752,756 to Bartel illustrates an electrical system with at least one electric load unit being disconnectably arranged on a surface an electrical system with at least one electric load unit (E) magnetically attached to a surface (F) being provided with path conductors (L).

U.S. Pat. No. 6,449,167 to Seymour disclosed a method and system with a magnetically attractive breadboard and associated devices for constructing and testing electronic circuits. U.S. Pat. Nos. 7,758,349 and 7,611,357 to Han, et al. illustrated a printed circuit boards and breadboard devices having contact pads and magnetic component connectors where connection between the contact pads and the magnetic component connectors are made by magnetic force. Either the contact pad or the magnetic component connector will be magnetic and the other will be made of a material to which a magnet will be attracted.

U.S. Patent Application 20030043554 by Seymour discloses a method and system with a magnetically attractive breadboard and associated devices for constructing and testing electronic circuits. The breadboard can comprise a single or multi-layer circuit board with metallic foil conductors that can be connected to magnetically attractive pads. Electrical contacts between the pads and foil conductors can be made by wrapping the foil over an edge of insulating material.

U.S. Patent Application 20040229489 by Lu illustrates a circuit-toy assembly kit includes a plurality of connector units each including a supporting frame, two terminal fasteners spacedly affixed to the supporting frame, and a terminal circuit electrically connecting with the terminal fasteners.

U.S. Patent Application 20050036264 by Aguilar illustrates an assembly structures that are characterized to allow electronic components quick, safe, easy to modify (manipulate by hands without tools), and visually intuitive (topographic) three-dimensional construction of circuits.

None of the prior art illustrates an educational kit for practicing electronic circuit design for beginners/kids so simple and easy to assemble an electronic circuit and to change the configuration as shown in the current application.

SUMMARY OF THE INVENTION

In many instances, a circuit is hand soldered by a person assembling an electronic circuit. For example, a kit for a particular type of circuit, such as a radio, may be given to or otherwise obtained by a child to assemble for educational purposes. The kit will usually include a printed circuit board and the necessary electronic components to be connected by soldering to the printed circuit board to make the desired circuit. The soldering of the components is usually not an essential learning step to be performed by the child and, soldering can be difficult and dangerous for a child. First, the person doing the soldering has to have a soldering iron. An inexperienced person can easily burn himself or herself with the soldering iron. Also, excessive heat can damage and destroy electronic components. Thus, if too much heat is applied to a component during soldering, the component can be destroyed. Further, if substitution of components is a part of the learning exercise in assembling and working with the circuit, or is part of designing and testing a new circuit, soldering the components to the printed circuit board is not productive in that a particular component may have to be un-soldered to disconnect it from the circuit to replace it with a substitute component. Meanwhile, various bread boarding devices are available for use in designing electronic circuits where the leads of electronic components can be inserted into connectors on a breadboard device, such bread boarding devices generally require special knowledge of the devices and how they work and are not generally used in merely assembling a particular desired circuit in an educational kit. It is the purpose of the current application to provide an educational kit to set up a desired electronic circuit without soldering and change the configuration of the electronic circuit by just rearrange of the electronic components on a board. An educational kit for teaching kids/beginners about designing electronic circuit is provided. The educational kit according to the current application comprises of; 1) a square hard board comprised of a stiff non-conductive material, 2) a steel plate encasing back side of the square board, 3) pluralities of various kinds of electronic components which have wire type leads/terminals for connection, 4) pluralities of small permanent magnets of circular shape, and 5) a separate manual wherein various electronic circuits are printed thereon. Pluralities of dents of circular shape and square shape are developed on the front side of the board to receive magnets and electronic components, respectively. Another embodiment of the hard board has pluralities of circular or square dents spaced with same intervals.

DETAILED DESCRIPTION OF THE PREFERRED EMBODIMENTS

Figure 1:
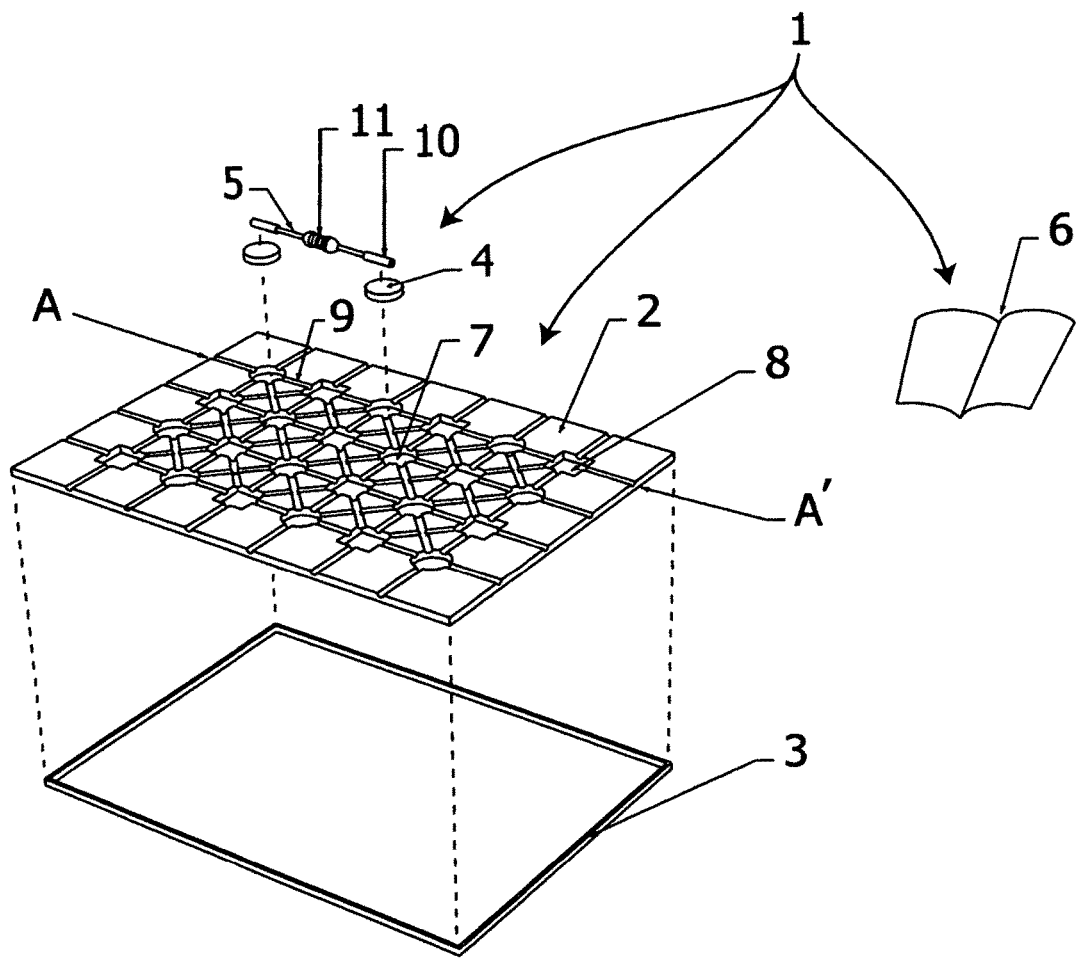
FIG. 1 is a perspective view of an educational kit for practicing electronic circuit design for beginners/kids according to the current application.

FIG. 1 is a perspective view of an educational kit (1) for practicing electronic circuit design for beginners/kids. The educational kit according to the current application comprises of; 1) a square hard board (2) comprised of a stiff non-conductive material, including but not limited to, plastic such as PVC (Poly vinyl chloride), wood, paper hard board, etc., 2) a steel plate encasing back side of the square board, 3) pluralities of various kinds of electronic components, such as resistor, capacitor, etc., which have wire type leads/terminals (5) for connection, 4) pluralities of small permanent magnets (4) of circular shape, and 5) a separate manual (6) wherein various electronic circuits are printed. Pluralities of dents of circular shape (7) and square shape (8) are developed on the front side of the hard board to receive magnets and electronic components, respectively. Each dents are spaced with same intervals and connected each other via straight grooves (9). Circular dents receive (7) circular permanent magnets (4) and square dents receive electronic components. Several electronic circuits are printed on a separate manual.

Figure 2:
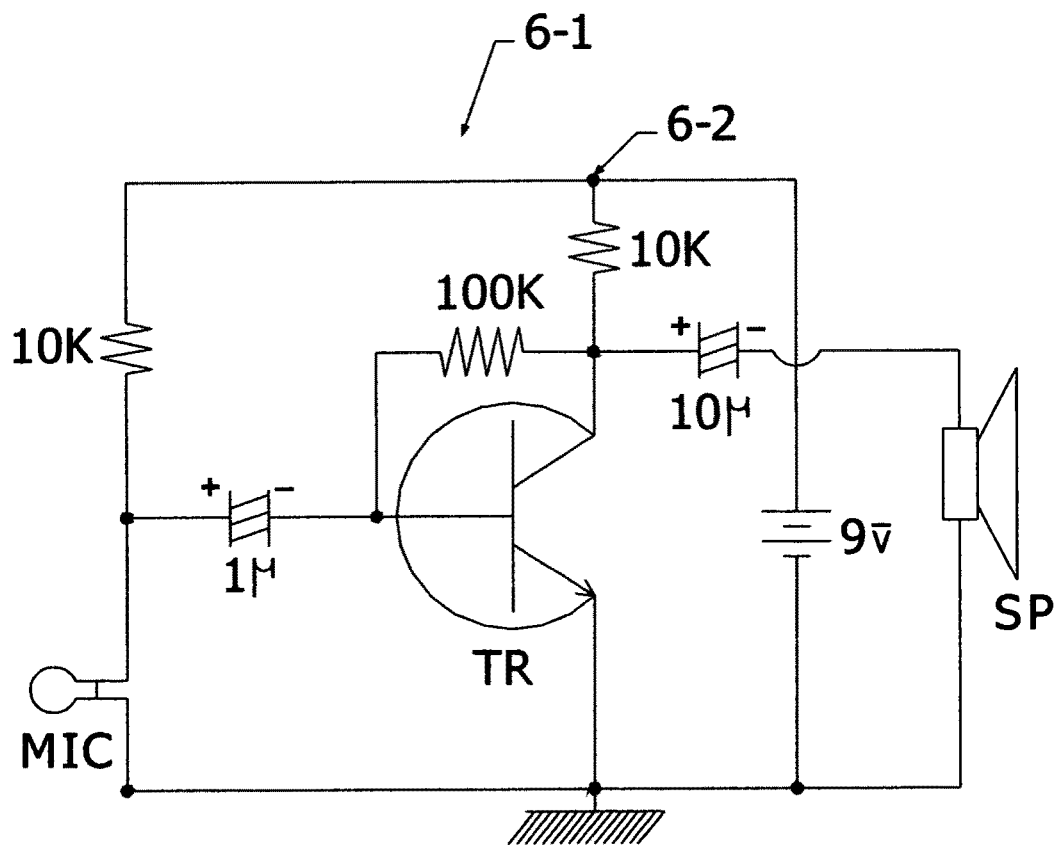
FIG. 2 is an example of an amplifier electronic circuit printed on manual.
Figure 3:
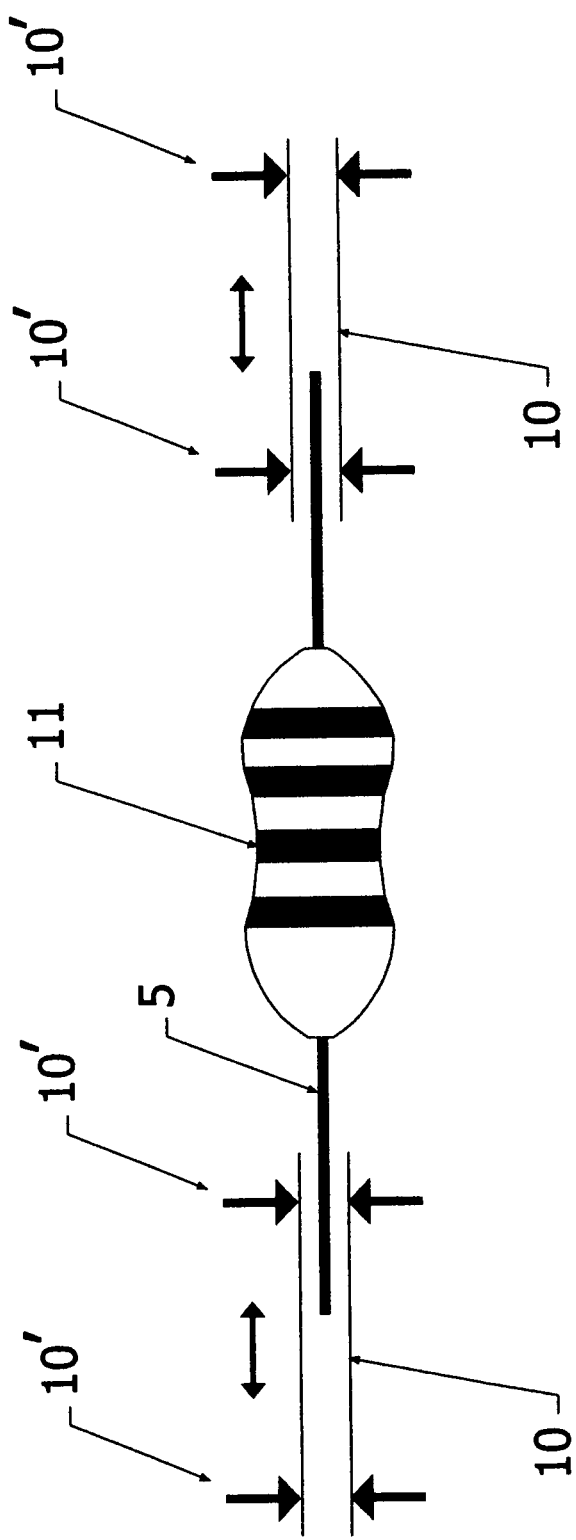
FIG. 3 is a schematic drawing of covering copper lead/terminals with narrow diameter steel tube.
Figure 4:
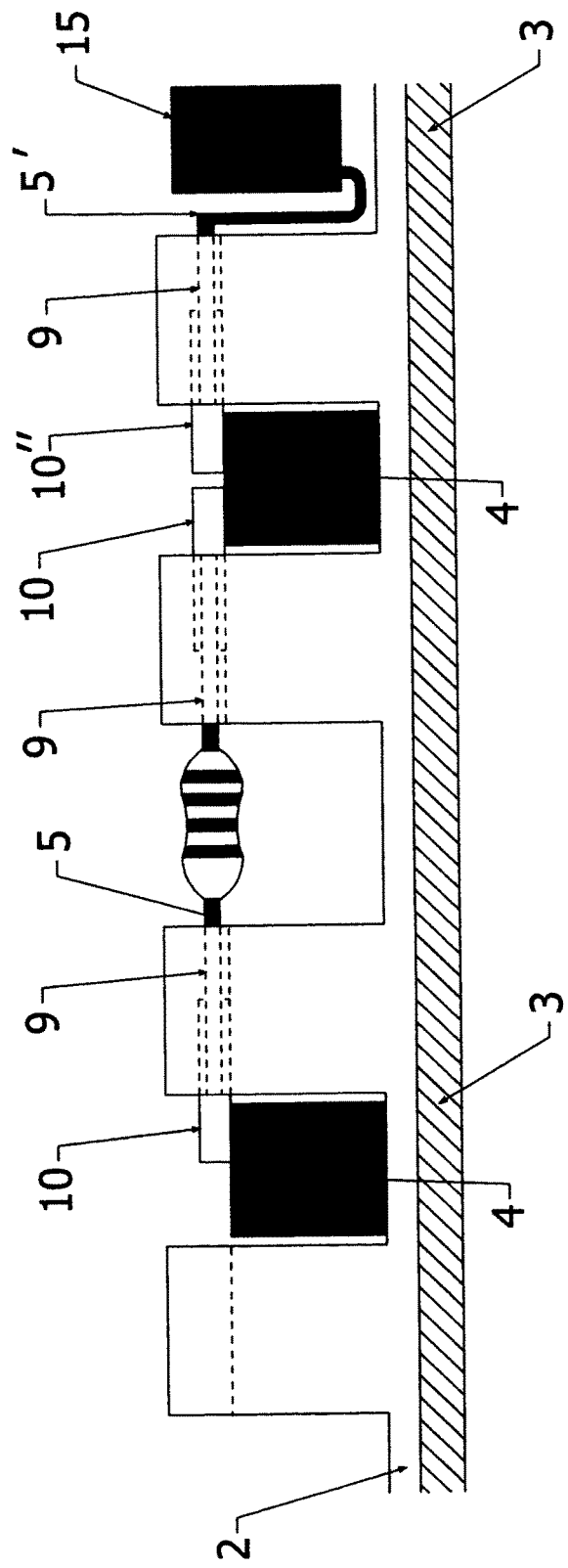
FIG. 4 is a cross sectional view of the section A-A' in the FIG. 1 showing how a resistance is hold in place by the magnetic force between steel plate, circular shape permanent magnet and steel tube covered leads/terminals.

The educational kit according to the current application is used as following example. When a user want to set up an electronic circuit, open the manual and select a circuit desired. FIG. 2 is an example of electronic circuit (6-1) of an amplifier printed on the manual (6). The connection points (6-2) indicate connection point. In the current invention these are small permanent magnets (4) whereon the leads/terminals of (5) each electronic components are connected by the magnetic force of the small permanent magnets (4). Put the hard board (2) on the paramagnetic metal sheet (3). Insert permanent circular magnets (4) to the circular dents (7) according to the electronic circuit (6-1) printed on the manual (6). Put electronic components on the square dents (8) according to the manual. All of the square dents (8) are neighboring to the circular dents (7). Put the leads/terminals (5) of the electronic components (registor, capacitor, etc.) on the circular permanents magnet. If the leads/terminals (5) of the electric components are made of copper wires, insert the leads/terminals (5) into small diameter steel tubes (10) and clamp (10') both ends of the steel tube (10) as shown in the FIG. 3 to render magnetic property to the leads/terminals (5). Length of the leads/terminals can be adjusted by moving the steel tube (10) outer-ward and clamp or cut out of the clamped tip. The steel tube (10) covered leads/terminals (5) are partly inserted into the straight grooves (9). FIG. 4 is a cross sectional view of the section A-A' in the FIG. 1 showing how a resistance (11) is hold in place by the magnetic force between steel plate (3), circular shape permanent magnet (4) and steel tube (10) covered leads/terminals (5). Magnetic force between the steel tube (10) covered leads/terminals (5), circular permanent magnets (4) and the metal plate (3) below the non-conductive hard board (2) hold the components of the selected electronic circuit in place as shown in the FIG. 4. The circular permanent magnets (4) are shared by another steel tube (10") covered leads/terminals (5') from another electronic components such as capacitance (12). Connect power source such as battery to power inlet will make the electronic circuit work because the circular magnets (4) are conductive to electrical current. After one experiment is done, turn the stiff board's front face down and separate the steel plate (3). Then the circular permanent magnets (4) falls out of the circular dents (7). Then separate the electronic components from the circular permanent magnets (4). No soldering step is involved in assembling step of the electronic circuit and disassembling step. Next test of another electronic circuit can be started immediately without any additional preparation.

Figure 5:
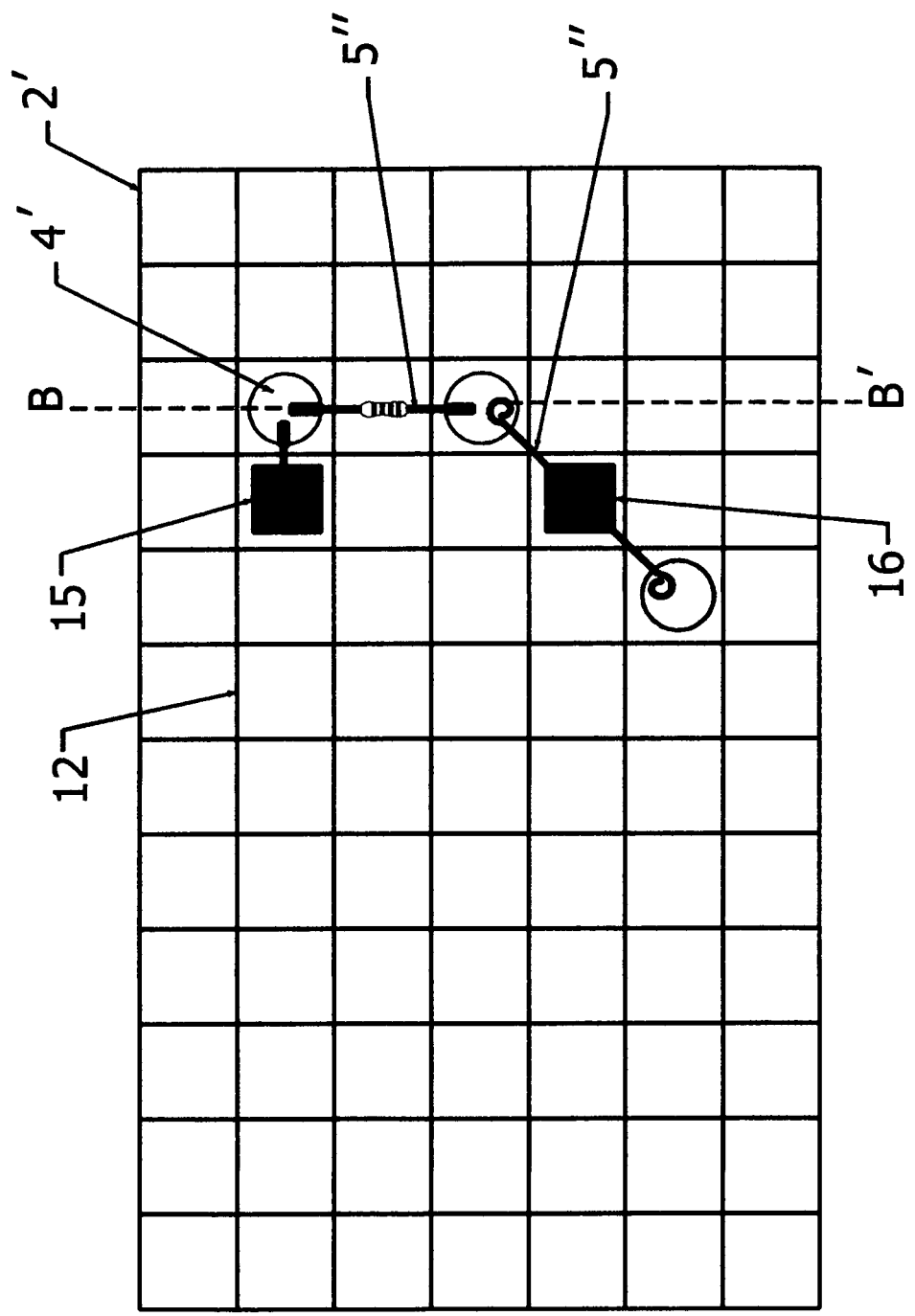
FIG. 5 is a front view of another embodiment of the hard board of the educational kit for practicing electronic circuit design for beginners/kids according to the current application.
Figure 6:
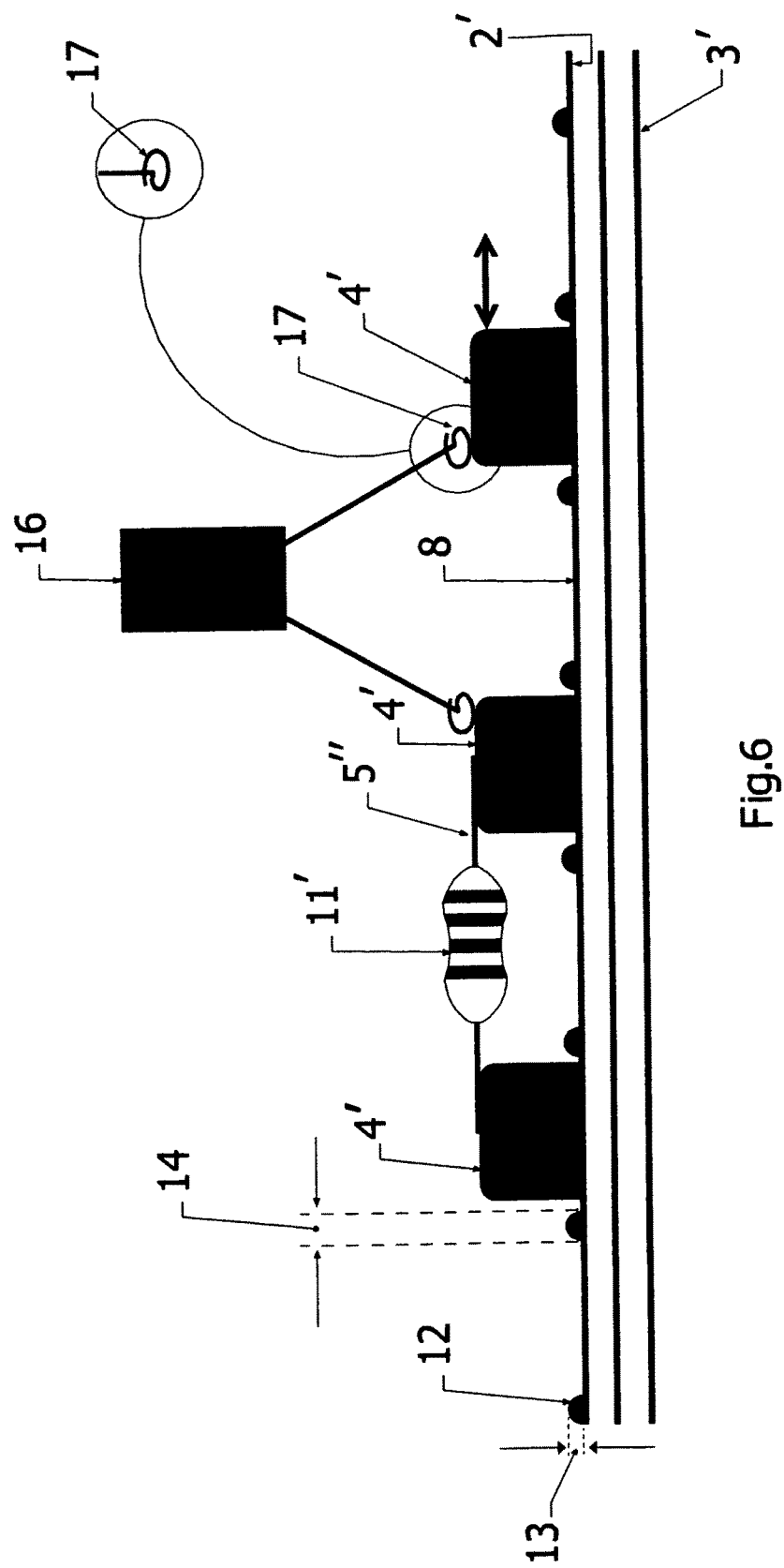
FIG. 6 is a cross sectional view of the embodiment of the hard board of the educational kit for practicing electronic circuit design for beginners according to the current invention along the section B-B' in the FIG. 5.

FIG. 5 is a front view of another embodiment of the hard board (2') of the educational kit for practicing electronic circuit design for beginners. Pluralities of square shape dents (8') are developed throughout the front surface of the hard board (2'). FIG. 6 is a cross sectional view of the embodiment of the hard board (2') of the educational kit for practicing electronic circuit design for beginners according to the current invention along the section B-B' in the FIG. 5. The square dents (8') are formed by small humps (12) of non-conductive material, whose height (13) is 1 mm and width (14) is 2 mm, connected in square shape to avoid short circuit by direct contact of circular shape permanent magnets (4') and for easy movement to a desired position just by sliding the circular shape permanent magnets (4'). On the hard board (2'), circular shape permanent magnets (4') and electronic components (15), (16) are located on the neighboring square dents (8'). Each electronic components are connected with other electronic component via the steel leads/terminals (5"), which contact with the circular shape permanent magnets (4'). The magnets (4') and steel leads/terminals (5") are hold in place in the dent (8') by the magnetic force that attracts the steel leads/terminals (5") and steel plate (3') below the hard board (2'). Some electronic component's (16) can be placed up ward between magnets (4') by folding the end of the leads in a flat shape (17). Electricity from the power source, such as battery, flows through the leads/terminals (5") because all the components and the magnets (4') are comprised of conductive materials.

As described above the educational kit for practicing electronic circuit design for beginners/kids according to the current application enables a user an easy and clean practice of designing a new electronic circuit and enables a beginner, including kids, a safe and clean experiment to understand principle of electronic circuits.

What is claimed is:

1. An educational kit for practicing electronic circuit design for beginners comprises of;
   a square hard board comprised of a stiff non-conductive material, wherein pluralities of dents of circular shape and square shape are developed on front side of the hard board to receive magnets and electronic components, respectively;
   a steel plate encasing back side of the square board;
   pluralities of various kinds of electronic components, which have wire type leads and terminals for connection;
   pluralities of small permanent magnets of circular shape; and
   a separate manual wherein various electronic circuits are printed.

2. An educational kit for practicing electronic circuit design for beginners of claim 1, wherein the stiff non-conductive material is PVC (Poly vinylchloride).

3. An educational kit for practicing electronic circuit design for beginners of claim 1, wherein the stiff non-conductive material is wood.

4. An educational kit for practicing electronic circuit design for beginners of claim 1, wherein the stiff non-conductive material is paper hard board.

5. An educational kit for practicing electronic circuit design for beginners of claim 1, wherein each dents are spaced with same intervals and connected each other via straight grooves.

6. An educational kit for practicing electronic circuit design for beginners of claim 1, wherein each electronic components are connected by the small permanent magnets through their terminals and leads.

7. An educational kit for practicing electronic circuit design for beginners of claim 1, wherein both of the terminals and leads of the electronic components are covered with small diameter steel tube and clamped, when the terminals and leads are made of copper wires, to render magnetic property to the terminals and leads.

8. An educational kit for practicing electronic circuit design for beginners comprises of;
   a square hard board comprised of a stiff non-conductive material, wherein pluralities of square shape are developed on front side of the hard board to receive magnets and electronic components;
   a steel plate encasing back side of the square board;
   pluralities of various kinds of electronic components, which have wire type steel leads and terminals for connection;
   pluralities of small permanent magnets of circular shape; and
   a separate manual wherein various electronic circuits are printed.

9. An educational kit for practicing electronic circuit design for beginners of the claim 5, wherein square dents are formed by small humps of non-conductive material, whose height is 1 mm and width is 2 mm, connected square shape to avoid short circuit by direct contact of circular shape permanent magnets and for easy movement to a desired position just by sliding the circular shape permanent magnets.

* * * * *